United States Patent Office  3,787,436
Patented Jan. 22, 1974

3,787,436
2-(DIPHENYL AMINO-ALKYL AMINO)-2-IMIDAZOLINES
Claude Louis Clément Carron, Chatenay-Malabry, Bernard Philippe Bucher, L'Hay-les-Roses, and Alexandra Francine Jullien, Paris, France, assignors to Synthelabo S.A., Paris, France
No Drawing. Filed Mar. 9, 1971, Ser. No. 122,515
Claims priority, application France, Mar. 12, 1970, 7008877
Int. Cl. C07d *49/34*
U.S. Cl. 260—309.6       3 Claims

ABSTRACT OF THE DISCLOSURE 2-(diphenyl amino-alkyl amino)-2-imidazolines having the formula

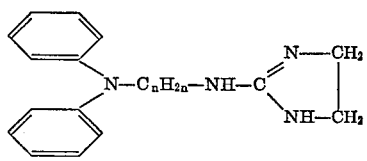

with $n$ representing an integer of from 1 to 5 are disclosed. The acid addition salts from pharmaceutically acceptable organic and mineral acids are also disclosed. The materials have a bronchodilatory, anti-tussive and spasmolytic activity.

---

This present invention relates to derivatives of 2-amino-2-imidazoline, their addition salts with pharmaceutically acceptable mineral or organic acids and processes for their preparation.

The compounds of the present invention have the general Formula I

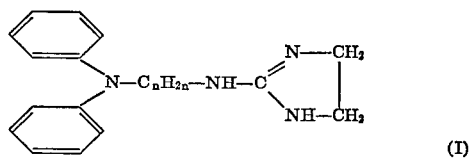

(I)

wherein $n$ is a number between 1 and 5 and preferably is 2 or 3

These compounds can be used in human and veterinary medicine, particularly as bronchodilators, and serve as intermediates in chemical synthesis.

The new compounds of the invention may be prepared by reaction of an ω-(diphenylamino)alkylamine with a hydrohalide of 2-methylthio-2-imidazoline, according to the following reaction:

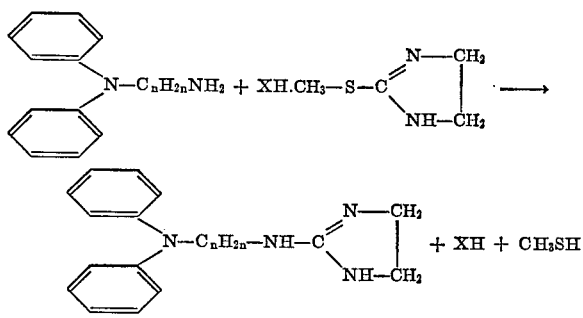

This synthesis is preferably effected in an alcoholic diluent such as methanol, or in a hydroxy polar solvent such as a glycol, a phenol, an alkoxy alcohol, water or the like, at its boiling temperature.

The starting material, ω-(diphenylamino)-alkylamine, may be prepared by reduction of the corresponding nitrile in a medium of ether, with the aid of lithium aluminium hydride.

The salts of the compounds are readily obtained by reacting these latter with pharmaceutically acceptable acids, such as hydrochloric, tartaric, citric, maleic, ascorbic and like acids.

The following non-limitative examples will serve to illustrate how the invention may be put into effect. Temperatures are in degrees centigrade.

EXAMPLE 1

2-(2-diphenylamino-ethyl amino)-2-imidazoline (Formula I, $n=2$, Code No. 97-00 R & C) and its neutral tartrate (a) Diphenylamino-acetonitrile $(C_6H_5)_2N$—$CH_2CN$  is prepared according to a variant of the method of Marxer (Helv. Chim. Acta, 1954, 37, 166) wherein a mixture of diphenylamine, paraformaldehyde, and glacial acetic acid is warmed and to which is added an aqueous solution of a metal cyanide and the appearing oil is extracted with ether, neutralized, washed, and distilled. It is converted by reduction to 2-diphenylamino-ethylamine $$(C_6H_5)_2N-CH_2-CH_2-NH_2$$

in the following manner.

There is placed in a 500 ml. reaction flask 165 ml. of anhydrous ether and then 6.95 g. (0.160 mole) of lithium aluminium hydride. It is cooled, under an atmosphere of nitrogen, to $+2°$ and there is added, drop by drop, over half an hour, with stirring, a solution of 23 g. (0.111 mole) of nitrile in 80 ml. ether. While continuing the stirring the mixture is allowed to recover to 20° and is then brought, during 10 minutes, to boiling.

It is vigorously cooled and then while continuing the stirring in an atmosphere of nitrogen, there is added, very slowly, especially at first, 31 ml. of water. The precipitate formed of metallic hydroxides is separated and it is washed several times with ether. The solvent is evaporated in vacuo. There is obtained 20 g. of an oil which is not purified. Thin layer chromatography shows that the product contains no secondary amine and is practically free of diphenylamine.

To obtain the desired 2-imidazoline derivative there is brought to reflux, under a nitrogen atmosphere, a mixture of 29.2 g. (0.103 mole) of the above amine with 24.4 (0.1 mole) of 2-methylthio-2-imidazoline hydriodide and 30 ml. of methanol. The methyl mercaptan which is formed is recovered in an excess of a 5 N solution of soda. The reaction initiates when the temperature of the bath reaches 55°. It is heated 1½ hours from the time when the reaction temperature is 67°. The quantity of mercaptan evolved indicates that the degrees of conversion is 85%.

The methanol is evaporated in vacuo and the residue is taken up in 200 ml. chloroform and is made alkaline with 75 ml. of 2 N soda. After decantation, it is washed with 100 ml. of N soda and then twice with 100 ml. of water. It is dried over sodium sulphate. It is evaporated in vacuo and the residue crystallized by addition of 70 ml. benzene.

The precipitate is washed with anhydrous acetone. There is obtained 18 g. of product, i.e. a yield of 64%, melting point 130°. Analysis (of base): M theory, 280; M found, 282.5.

(b) The neutral tartrate of 97–00 R & C is prepared by reaction of tartaric acid and the amine obtained, in a mixture of acetone and methanol (1:1 by volume). Melting point 190°. Analysis: Eq., theory 355; Eq., found 360.

The solubility in water is 0.5%, the pH of the saturated solution being 6.

EXAMPLE 2

2 - (3 - diphenylamino - n - propylamino)-2-imidazoline (Formula I, $n=3$, Code No. 97–01 R & C) and its hydrochloride (a) The starting diphenyl amino-propionitrile

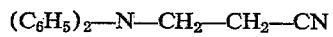

is prepared according to the method of Cookson and Mann (J. Chem. Soc 1949, 67–72) wherein a mixture of diphenylamine, acrylonitrile, and copper acetate dissolved in acetic acid and copper powder is heated and distilled to give diphenyl amino-propionitrile.

It is converted by reduction to the diamine

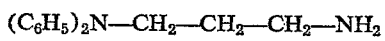

according to the method described in Example 1. The diamine is obtained in a yield of 50% by fractionating the oily residue. It boils at 136–144°/0.02 mm.

The synthesis of the 2-imidazoline derivative is effected according to the technique of Example 1. The yield is of the same order. Melting point 138°. Analysis (of base): M theory, 294; M found, 295.

(b) The mono-hydrochloride is prepared by heating the base with an equivalent of hydrochloric acid in N solution in water. The salt is a white crystalline solid containing 5% of water of crystallization. Analysis Cl percent: Calculated, 10.8. Found, 10.9.

The solubility in water is 1%, the pH of the saturated solution being 6.

The new products of the invention have been subjected to a pharmacological study which has revealed, predominantly, broncho-dilatatric and spasmolytic properties. In these tests the reference substance was aminophylline. The compound 97–00 R & C was used in the form of its tartrate and the compound 97–01 R & C in the form of its mono hydrochloride.

Acute toxicity

The tests were carried out on mice of both sexes, of Swiss strain, of weight varying between 18 and 22 g. The 50% lethal doses (DL/50) were calculated according to the method of Miller and Tainter (Proc. Soc. Exp. Biol. Med. 1944, 57, 261). The results are collected in Table 1.

TABLE 1.—TOXICITY

| Product | DL$_{50}$ (mg./kg.) | | |
|---|---|---|---|
| | Oral route | Ip. route | I.v. route |
| 97–00 R & C | 950 | 75 | |
| 97–01 R & C | 1,000 | 150 | 14 |

Broncho-dilatatric effects (1) Study on an isolated organ

The isolated trachea of the guinea-pig, cut spirally according to the original method of Castillo and de Beer (J. Pharmacol. Exp. Ther. 1947. 90, 2), modified by Constantine (J. Pharm. Pharmacol, 1965, 17, 384) was used.

The organ being suspended in a standard tank fed with Ringer-Locke liquor enriched with glucose and maintained at 38° C., the 50% efficient dosage was determined, i.e. that which is able to inhibit 50% of the contractions provoked by acetyl choline added in the bath at a concentration of 5 µg./ml. The results were as follows:

97–01 R & C: DE 50=7.5 µg./ml.
amino-phylline: DE 50=50 µg./ml.

(2) Studies in vivo (1) Bronchial tonus, in situ, in the sleeping guinea pig.—The technique of Konzett and Roessler (Arch. Exp. Path. Pharmakol, 1940, 195, 71) revised by Halpern (Arch. Int. Pharmacodyn, 1942, 68, 339) and by Schaepdryver (Ibid. 1950), 82, 207) was used.

Tricolored guinea-pigs of both sexes, of weight 500–600 g. were used. The bronchial spasm was provoked, according to the sensitivity of the animal being studied, by 5 to 50 µg. of histamine, by 10 to 50 µg. of acetylcholine, or by 2 to 10 µg. of serotonin.

The products studied in aqueous solution were injected intravenously. The results are collected in Table II.

TABLE II.—KONZETT METHOD

| Product | Dose (i.v.), mg./kg. | Effect |
|---|---|---|
| 97–00 R & C | 2.5 | Slight bronchodilatation clear bronchodilatation. The effect of acetyl choline is unchanged. Those of histamine and serotonin are inhibited. |
| 97–00 R & C | 10 | |
| 97–01 R & C | 2.5 | Clear bronchodilatation but transient. |
| 97–01 R & C | 10 | Intense and lasting bronchodilatation. Little effect is observed on the reactions provoked by the three spasmogenic agents. |
| Aminophylline | 10 | Very slight and very transient bronchodilatation. Clear reduction in the effect of the three spasmogenic agents. |

(2) Bronchospasm provoked by aerosols.—The experimental method of Halpern (Arch. Int. Pharmacodyn, 1942, 68, 339) was used on tricolored guinea-pigs of both sexes weighing 200 to 300 g. A bronchospasm was provoked by aerosol using a solution containing, per 100 ml., 120 mg. acetylcholine, 60 mg. histamine and 60 mg. of serotonin. Only animals reacting in less than 1 minute were considered. After 3 days rest, the test was repeated 30 minutes after the intraperitoneal administration of the test products and the new exposition time necessary for the appearance of the spasm was noted. The results are presented in Table III.

TABLE III.—AEROSOLS

| Products | Dose (i.p.) (1/5 DL$_{50}$), mg./kg. | Increase in time of exposition (in percent) |
|---|---|---|
| 97–01 R & C | 30 | 94 |
| Aminophylline | 50 | 75 |

Antitussive activity

The superior laryngeal nerve of the cat was stimuated according to the technique of Dominjoz (Arch. Exp. Path. Pharmakol, 1952, 215, 19), provoking thus a fit of coughing against which the test product was used as a cure.

The compound 97–01 R & C conferred a clear protection against fits of coughing at a dose of 10 mg./kg. by the i.v. route.

Spasmolytic activity (I) Action in vitro.—The classic technique of Magnus (Pfluger's Archiv. 1904, 102, 123) was used. An isolated organ (duodenum of the rat, ileum of the guiena-pig) was placed in a 20 ml. vessel containing an aerated solution of tyrode, at 37°. The concentration of the product necessary to inhibit 50% of the contractions of the organ provoked by a spasmogenic agent (barium chloride at 200µ g./ml., acetylchloine at 0.5µ g./ml. or histamine at 1µ g./ml.) was determined.

Various reference substances were used. The results are given in Table IV.

TABLE IV.—SPASMOLYTIC EFFECT IN VITRO

| Product | $DE_{50}$ | | |
|---|---|---|---|
| | Duodenum of rat, spasm by— | | Ileum of guinea-pig histamine, μg./ml. |
| | $BaCl_2$, 1μg./ml. | Acetylcholine, μg./ml. | |
| 97–00 R & C | 1 | | |
| Papaverine | | | 10 |
| 97–00 R & C | | 2.5 | |
| Atropine | | 0.001 | |
| 97–000 R & C | | | 4 |
| Promethazine | | | 0.025 |
| 97–01 R & C | 0.5 | | |
| Papaverine | 5 | | |
| 97–01 R & C | | | 1 |
| Atropine | | | 1 |
| 97–01 R & C | | 0.001 | |
| Promethazine | | | 0.025 |

(II) Action in vivo.—The jejunum of the rabbit was stimulated electrically according to the method of Levy and Apffel (Thérapie 1967, 22 397).

There is thus determined, at regular interval, after the injection i.v. of the test products, the percentage reduction in the amplitude of contractions due to the stimulation. The reference substance was papaverine. The results are collected in Table V.

TABLE V.—SPASMOLYTIC EFFECT IN VIVO

| Product | Dose (i.v.), mg./kg. | Effect |
|---|---|---|
| 97–00 R & C | 5 | Diminution of 50% of the amplitude of the contractions. |
| 97–01 R & C | 2.5 | Diminution of 75% of the amplitude of the contractions during 10 minutes. |
| Papaverine | 15 | Diminution of 50–75% of the amplitude of the contractions during 10 minutes. |

Pressure and respiratory effects

These effects were studied in the dog. The results are as follows:

97–00 R & C—already at 500 μg./kg. (i.v. route) one observes a slight hypotension; this becomes more important and lasting at stronger doses (up to 5 mg./kg.). The femoral flux is slightly increased but there is no effect on the coronary flux.

97–01 R & C—little or no pressure effects are observed at doses of 1 to 5 mg./kg. (i.v. route). Increases in the cardiac rhythm, the respiratory movements and the femoral flux are observed.

At 10 mg./kg. a strong but transienthypotension, a dyspnoea following apena with rapid return to normal, and an increase in cardiac rhythm and femoral flux are noted.

Various effects

The compound 97–01 R & C provokes a slight potentialisation of barbiturate hypnosis. On the other hand it has no analgesic or anti-inflammatory action.

The products studied, therefore possessed broncho-dilatatric, antitussive and spasmolytic properties which appear particularly clearly in the in vivo studies. They can be used in human and veterinary medicine, in affections of the respiratory passages, as for example asthma and bronchitis, as well as in spasms of fibres, in particular of the intestine, of the biliary vesicles and of the urinary passages.

The administration may be made by the oral, rectal, parenteral or aerial manner (for example in the form of aerosols).

The following non-limitative examples give the composition of some pharmaceutical forms which can be formulated.

Tablets

| | G. |
|---|---|
| Tartrate of 97–00 R & C | 0.10 |
| Rice starch | 0.07 |
| Talc | 0.10 |
| Magnesium stearate | 0.003 |

These tablets may be coated or made into dragees. The content of active compound may be from 0.05 to 0.50 g. and it is possible to utilize all the usual excipients in this form of the product.

Syrup

The mono-hydrochloride of 97–01 R & C in sugar solution and aromatized, containing 0.10 g. of the active product for 15 ml. of solvent.

Suppositories (for adults)

Mono-hydrochloride of 97–01 R & C _____g__ 0.25

Imhausen excipient sufficient to make one suppository.

Other common excipients, such as cocoa butter, can be used. The dose of the active product may vary from 0.10 to 0.50 g.

Injectable solutions

Ampoules of 1 to 10 ml. size containing an isontonic solution having a concentration of 1% of the monohydrochloride of 97–01 R & C. Administration may be by i.m., s.c. or i.v. routes.

Aerosols

A solution similar to that described for parenteral administration is used.

It will be understood that the medicines may contain one or more of the compounds of the invention, in the form of the bases of their pharmaceutically acceptable salts.

The daily dosage is from 10 to 300 mg. according to the method of administration.

We claim as our invention:

1. A compound selected from the class consisting of 2-amino-2-imidazoline derivatives of the formula

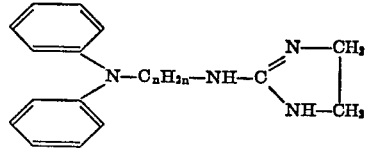

(1)

wherein $n$ is an integer from 1 to 5, and acid addition salts thereof formed with pharmaceutically acceptable organic and mineral acids.

2. A compound selected from the class consisting of the compound 2-(2-diphenylamino-ethylamino)2-imidazoline and addition salts thereof formed with pharmaceutically acceptable organic and mineral acids.

3. A compound selected from the class consisting of the compound 2-(3-diphenylamino-n-propylamino)2 - imidazoline and addition salts thereof formed with pharmaceutically acceptable organic and mineral acids.

References Cited

FOREIGN PATENTS

| 1,271,759 | 8/1961 | France | 260—309.6 |
| 796,997 | 6/1958 | Great Britain | 260—309.6 |
| 1,049,285 | 11/1966 | Great Britain | 260—309.6 |
| 234,984 | 3/1945 | Switzerland | 260—309.6 |

OTHER REFERENCES

Elderfield Heterocyclic Compounds, vol. 5, p. 240, N.Y., Wiley, 1957, QD400.E4.

Najer et al. Bul. Soc. Chim., France 1962, pp. 556–9, QD1.54.

NATALIE TROUSOF, Primary Examiner

U.S. Cl. X.R.

260—465 E, 570.5 P; 424—273